Figure 1:
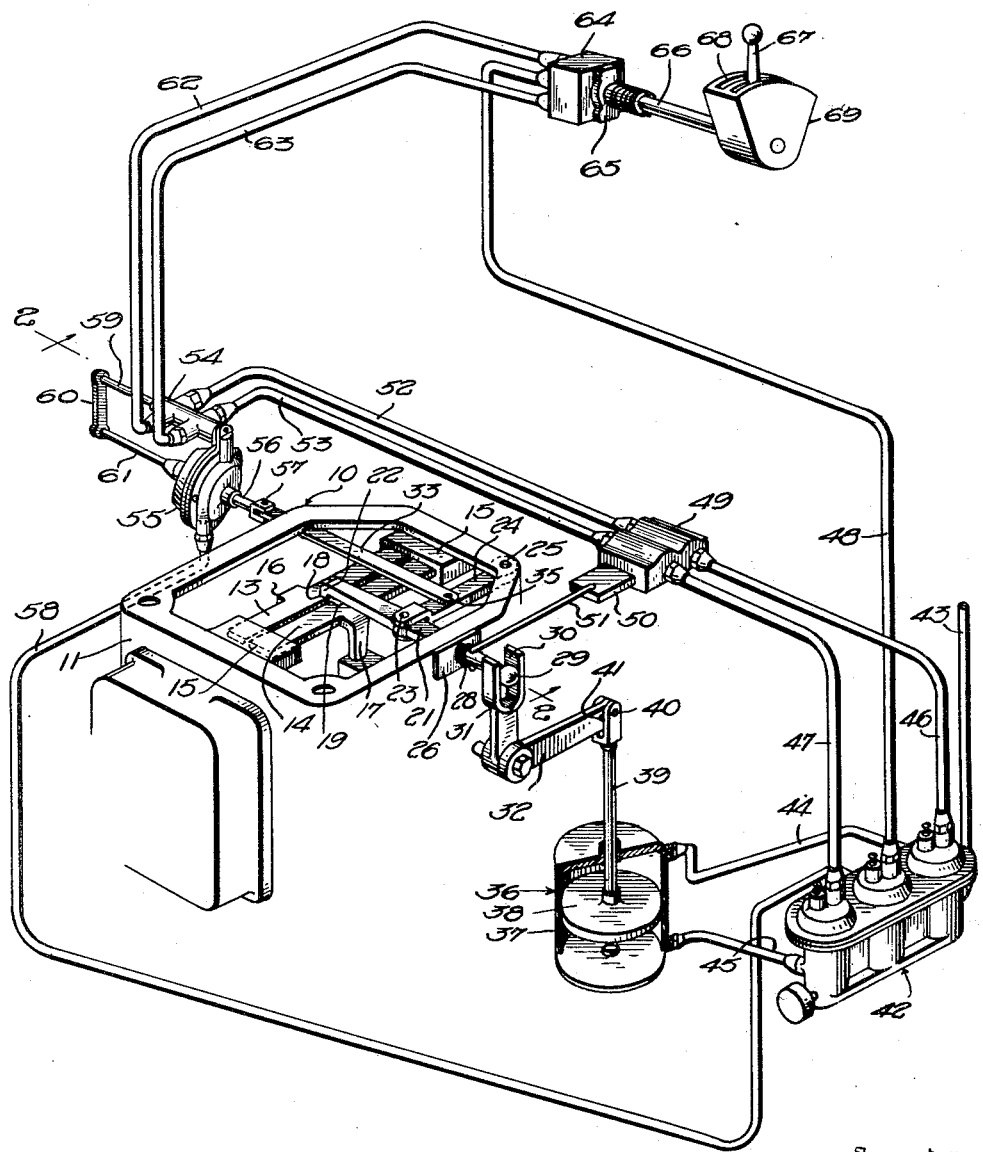

Oct. 31, 1939.  E. D. LASLEY  2,178,177
GEAR SHIFTING MECHANISM FOR MOTOR VEHICLES
Filed Sept. 8, 1936  3 Sheets-Sheet 1

Inventor
E. D. LASLEY

By
[signature]
Attorney

Oct. 31, 1939.  E. D. LASLEY  2,178,177
GEAR SHIFTING MECHANISM FOR MOTOR VEHICLES
Filed Sept. 8, 1936  3 Sheets-Sheet 2

Inventor
E. D. LASLEY
By
Attorney

Oct. 31, 1939.  E. D. LASLEY  2,178,177
GEAR SHIFTING MECHANISM FOR MOTOR VEHICLES
Filed Sept. 8, 1936  3 Sheets-Sheet 3
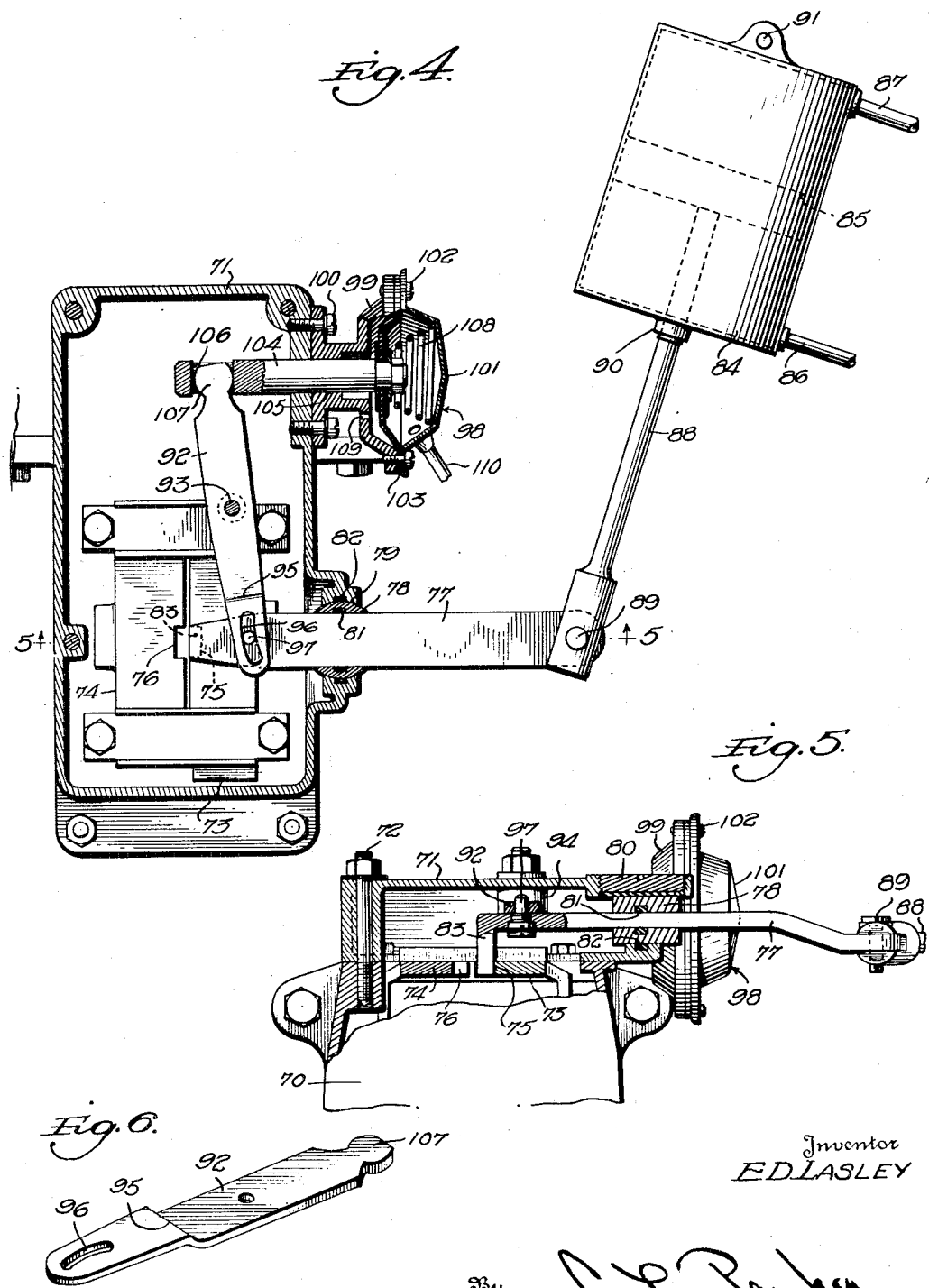
Inventor
E. D. LASLEY
By
Attorney Patented Oct. 31, 1939

2,178,177

UNITED STATES PATENT OFFICE 2,178,177

GEAR SHIFTING MECHANISM FOR MOTOR VEHICLES

Edward D. Lasley, Detroit, Mich., assignor to Automatic Shifters, Inc., Richmond, Va., a corporation of Virginia Application September 8, 1936, Serial No. 99,843

13 Claims. (Cl. 74—473)

This invention relates to gear shifting mechanisms for motor vehicles, and particularly to power operated shifting mechanisms of the type disclosed in the prior patent of Edward G. Hill and Henry W. Hey, No. 2,030,838, granted February 11, 1936.

There have been numerous developments in the art of power shifting mechanisms for motor vehicle transmissions, such mechanisms commonly employing differential pressure operated motors for effecting the shifting operations, together with suitable valve mechanisms for controlling the operation of the shifting motors. For example, in Patent No. 2,030,838, referred to above, a differential pressure motor is employed for effecting the longitudinal shifting action, and a "crossover" motor is employed for effecting transverse movement of the shifting lever to determine which side of the gear set shall be rendered operative. Each motor is provided with suitable control valves, which are operable by a selector lever arranged adjacent the steering wheel of the vehicle.

In most of the prior mechanisms of this type of which I am aware, the casing of the gear set is provided with a cover plate having the usual tower projecting upwardly therefrom, and a gear shift lever is universally supported by the tower with its lower end operative for effecting the shifting operation. The upper end of the gear shift lever is provided with a socket to receive a conventional gear shift operating handle, when the use of such handle becomes necessary.

The use of a gear shift lever of the character referred to for transmitting the shifting motion of the gear set permits the use of a manually operable gear shifting handle when necessary or desired, but the elimination of the tower on the cover of the gear set is desirable in the interest of simplification, and in order that the usual opening in the floor boards of the vehicle may be eliminated. The positive and accurate operation of a gear shifting mechanism of the type disclosed in the prior patent referred to so completely eliminates the necessity for the provision of means whereby the shifting operation may be manually performed, that the tower of the transmission may be eliminated, provided a simple and efficient shifting motion transmitting means be developed.

An important object of the present invention is to provide a simple and efficient shifting motion transmitting mechanism which completely eliminates the necessity for the use of a tower of the character referred to.

A further object is to provide a mechanism of this character wherein the use of the cover plate of the transmission for supporting any of the shifting elements may be completely eliminated, thus permitting the cover plate to be freely removed to provide access to the interior of the transmission.

A further object is to provide a shifting mechanism which may be completely supported by the cover plate of the transmission, if desired, thus rendering the mechanism readily accessible by removing the cover plate.

A further object is to provide a shifting mechanism adapted to be supported wholly by the cover plate of the transmission and operable in conjunction with the shift rods in exactly the same manner as the lower end of a conventional gear shift lever, thus permitting the cover plate of a conventional transmission to be removed together with the gear shift lever, and replaced by the present mechanism without altering the transmission itself in any manner.

A further object is to provide a mechanism of the character referred to wherein the operating elements within the transmission may be confined within extremely small height limits, thus facilitating the application of the device to the gear set.

A further object is to provide a novel form of lever mechanism and associated parts for quickly and efficiently transferring the shift from one side of the transmission to the other and for longitudinally shifting the selected shift rod.

Other objects and advantages of the invention will become apparent during the course of the following description.

In the drawings I have shown two embodiments of the invention. In this showing

Figure 2:
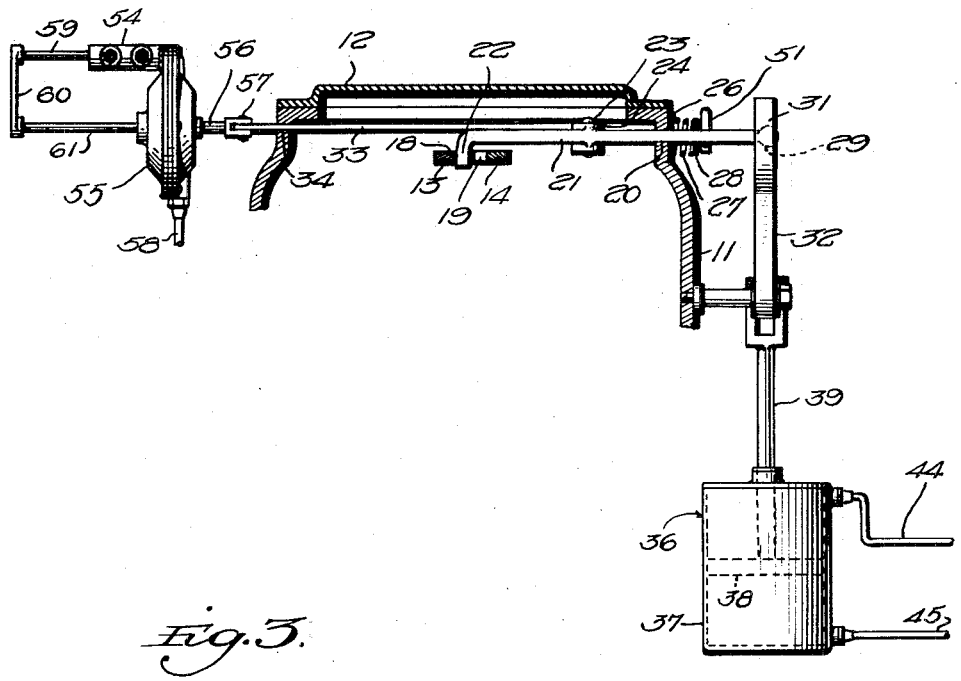
Figure 3:
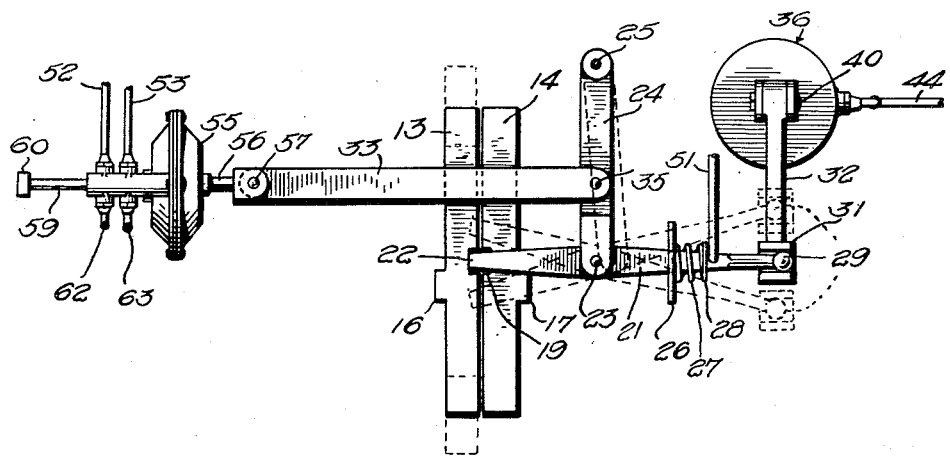

Figure 1 is a fragmentary perspective view of a portion of a motor vehicle gear set showing the power shifting means associated therewith, the cover plate of the transmission being removed and parts being broken away, Figure 2 is a vertical sectional view on line 2—2 of Figure 1, Figure 3 is a plan view of the motion transmitting mechanism and associated parts, shown detached from the transmission, Figure 4 is a horizontal sectional view through the transmission cover plate, showing a modified form of the invention, Figure 5 is a section on line 5—5 of Figure 4, parts being shown in elevation, and Figure 6 is a detail perspective view of the crossover lever.

Referring to Figure 1, the numeral 10 designates a motor vehicle gear set as a whole comprising a casing 11 having a flat-topped cover plate 12, as shown in Figure 2, such cover plate being omitted from Figure 1 for the purpose of illustration. It will become apparent that the use of the usual tower carried by the cover plate, is unnecessary.

The transmission is provided with a pair of shift bars 13 and 14, preferably rectangular in cross-section, as shown in Figures 1 and 2, and slidably supported at their ends in guides 15 carried by the casing 11. The shift bars are provided with depending fingers 16 and 17 through which motion is transmitted from the shift bars to effect the actual shifting operation, as will be obvious. The shift bars 13 and 14 are provided intermediate their ends with notches 18 and 19 respectively, these notches being formed in the inner edges of the shift bars and arranged opposite each other when the gear set is in neutral.

The casing 11 is provided at one side thereof with a horizontally elongated slot 20 through which the outer end of a lever 21 projects, and the inner end of this lever is provided with a depending finger 22 selectively engageable in the notches 18 and 19, in a manner to be described. The outer end of the lever 21 may be provided with a ball 29 for a purpose to be described. Intermediate its ends, the lever 21 is pivotally connected as at 23 to one end of a reach arm 24, and the opposite end of this arm is pivotally connected as at 25 to the casing 11. It will be apparent that the lever 21 is adapted to swing about the axis of the pivot 23 and to partake of bodily shifting movement laterally with respect to the vehicle.

The slot 20 may be closed by a slidable plate 26 urged against the adjacent portion of the casing 11 by a spring 27 backed by a washer or the like 28 carried by the portion of the lever 21 which projects outwardly from the casing 11. As the lever 21 swings about its pivot 23, therefore, the plate 26 seals the slot 20 to prevent the escape of lubricant from the transmission or the entrance of foreign material thereinto. The slot 20 is equal in height to the thickness of the lever 21, thus preventing the latter from moving vertically.

The ball on the projecting end of the lever 21 engages in a slot 30 formed between the arms of a yoke 31 carried by one arm of a bell crank lever 32. The lower arm of the bell crank lever is adapted to be power actuated in a manner to be described to swing the lever 21 about its pivot 23.

A link 33 projects through an opening 34 in the wall of the casing 11 opposite the slot 20 and has its inner end pivotally connected as at 35 to the reach arm 24 intermediate the length thereof. It will be apparent that in view of the arrangement of the pivotal connection 35 intermediate the ends of the arm 24, and in view of the limited movement of the lever 21 transversely of the transmission, the transverse component of movement of the pivoted end of the link 33 referred to will be negligible, and accordingly the opening 34 may have a sliding fit with the link 33. This link is adapted to be actuated in a manner to be described to transfer the shift between the shift bars 13 and 14.

A differential pressure motor 36 is adapted to transmit movement to the free end of the lower arm of the bell crank lever 32. Such motor comprises a cylinder 37 having a piston 38 reciprocable therein and provided with a vertically extending piston rod 39 pivotally connected as at 40 to the lower arm of the bell crank lever to transmit movement thereto. The motor 36, if desired, may be rigidly supported in any suitable manner and the lower arm of the bell crank lever may be slotted as at 41 for the reception of the pivot pin 40 to compensate for the swinging movement of the bell crank lever.

In the present instance, the shifting motor 36 is intended to be vacuum operated, and the intake manifold of the motor vehicle preferably constitutes the source of differential pressure. A main valve mechanism 42 controls the application of vacuum and atmospheric pressure to opposite ends of the motor cylinder 37, such valve mechanism being connected to the source of vacuum by a pipe 43. Control pipes 44 and 45 are connected at one end to the valve mechanism 42 and communicate with opposite ends of the motor cylinder 37.

Three pipes 46, 47 and 48 lead to the valve mechanism 42 to control the operation of the valves therein. The pipes 46 and 47 lead to a valve device 49 which includes a slide valve 50, and this valve is adapted to be actuated by a link 51 pivotally connected to the lever 21, as shown in Figure 1. The valve device 49 operates in accordance with the corresponding valve device in Patent No. 2,030,838, except that it is connected with the lever 21 to be actuated thereby instead of being actuated by the shift lever disclosed in the patent. The functioning of the valve is identical in both cases.

The pipes 46 and 47 communicate through the valve device 49 with the pipes 52 and 53 respectively, and these pipes lead to another valve device 54. Such valve device operates in the manner disclosed in the patent referred to, to permit gear preselection and to act as an "interlock" to prevent the piston 38 from moving out of a gear position and then back into the same gear position without having moved to neutral position to permit the crossover action to take place, when the next selected gear position requires such operation.

The valve device 54 is shown as being supported by a crossover motor 55 having a movable element (not shown) operable by differential pressure. The movable member of the crossover motor 55 is connected to a stem 56 which is pivotally connected as at 57 to the adjacent end of the link 33. The movable element of the crossover motor 55 is biased away from the observer in Figure 1 and is movable in the opposite direction by differential pressure. For providing the latter function, a vacuum pipe 58 is connected between the motor 55 and the valve mechanism 42, and this pipe is connected to the source of vacuum when atmospheric pressure is present in the pipe 48, in accordance with the disclosure in the patent referred to.

The valve device 54 contains two valves (not shown) one of which is controlled by the fluid pressure of the crossover motor 55 and the other of which is actuated by a stem 59 connected by a crosshead 60 to a rod 61 having its inner end connected to the movable element of the crossover motor 55, all of which will be clear from a consideration of the patent referred to.

The pipes 52 and 53 communicate respectively with pipes 62 and 63, when the valves of the valve device 54 are in normal position. The pipes 48, 62 and 63 lead to a manual selector valve mechanism indicated as a whole by the numeral 64. Such valve mechanism includes a valve 65 adapted to be rocked from the intermediate position shown in Figure 1 to open either of the pipes 62 or 63 to the atmosphere. The valve 65 is operated by a shaft 66 which is axially movable to open the pipe 48 to the atmosphere to effect operation of the crossover motor 55. The shaft 66 is actuated by a selector handle 67 which operates in an H-slot 68 formed in the arcuate upper face of a segmental housing 69. The functioning and controlling of the selector valve mechanism is also fully disclosed in the patent referred to.

A modified form of the invention is shown in Figures 4, 5 and 6 of the drawings, the mechanical shifting elements being carried by the transmission cover plate instead of by the housing. As shown, the transmission includes a housing 70 having a cover plate 71 mounted thereover and secured thereto by bolts 72. The cover plate is somewhat different than in the form of the invention previously disclosed, but the elimination of the tower minimizes the over-all height of the transmission and permits the latter to be arranged wholly beneath the floor boards.

The transmission includes the usual first and reverse gear shift rod 73 and the second and high gear shift rod 74, these shift rods being provided in their inner edges with notches 75 and 76 respectively, which are arranged opposite each other when the gear shift is in neutral position, as shown.

A horizontally arranged shift lever 77 extends through a cylindrical rocking member 78 mounted in a recess 79 formed in one wall of the cover plate 71, this recess being closed by a threaded cap 80, as shown in Figure 5. The rocking member 78 carries suitable packing 81, engaging the lever 77, while the recess 79 carries similar packing 82 for the rocking member 78. These packings obviously are provided to eliminate the leakage of lubricant from the transmission.

The lever 77 rocks in a horizontal plane about the vertical axis of the rocking member 78 and is longitudinally slidable therein. The inner end of the lever 77 is provided with a depending shift finger 83 selectively engageable in the notches 75 and 76, the sliding movement of the lever 77 in the rocking member 78 permitting the finger 83 to engage either of the notches referred to.

A differential pressure motor is provided for rocking the lever 77. This motor is similar to the motor 36 previously described and comprises a cylinder 84 having a piston 85 reciprocable therein, and pressures in opposite ends of the cylinder are controlled by means of pipes 86 and 87, connected to a valve mechanism of the type previously described. A piston rod 88 is connected at one end to the piston 85 and has its opposite end pivotally connected as at 89 to the outer end of the lever 77. The piston rod extends through a suitable bearing 90 in one of the heads of the motor cylinder. The opposite end of the motor cylinder is pivotally supported as at 91 to permit the cylinder to swing to compensate for the rocking and sliding movement of the lever 77.

A crossover lever 92 is arranged within the cover plate 71 and extends longitudinally thereof. This lever is pivoted intermediate its ends on a pivot pin 93 carried by a depending boss 94, preferably formed integral with the top of the cover plate 71. One end of the lever 92 is offset upwardly as at 95 (Figure 6) to extend over the inner end of the lever 77 and is arcuately slotted as at 96 to receive a pin 97 carried by and projecting upwardly from the lever 77. It will be apparent that when movement is imparted to the lever 92 transversely of the end thereof opposite the slot 96, the lever 77 will slide longitudinally to transfer the finger 83 between the shift rod notches 75 and 76.

A crossover motor is employed for effecting movement of the lever 92 in the manner described. Such motor is indicated as a whole by the numeral 98 and comprises a casing section 99, secured as at 100 to one side of the cover plate 71. The motor 98 further comprises a second casing section 101 secured as at 102 to the casing section 99, a flexible diaphragm 103 being clamped between the casing sections.

A shaft 104 is connected at one end to the diaphragm 103 and slides in a bearing 105 formed in the casing section 99. The inner end of the shaft 104 is horizontally and transversely slotted as at 106 to receive the rounded end 107 of the lever 92. A spring 108 urges the diaphragm 103 inwardly, and thus tends to turn the lever 92 in a counter-clockwise direction as viewed in Figure 4, thus biasing the shift finger 83 toward the slot 75 of the low and reverse shift rods 73. The casing section 99 is vented to the atmosphere as at 109, while the casing section 100 is adapted to be connected to a source of vacuum through a pipe 110 to move the diaphragm 103 against the biasing spring 108, and thus transfer the shift finger 83 to the notch 76.

The operation of the form of the invention shown in Figures 1, 2 and 3 is as follows:

The apparatus operates generally in accordance with the disclosure of Patent No. 2,030,838 previously referred to and need not be described in detail. As a matter of fact, the mechanisms 35, 36, 42, 49, 54, 55 and 64, and associated elements, operate exactly in accordance with the disclosure of such patent. It will be noted, however, that the valve mechanism 54 is provided for the purpose of permitting preselection and for the purpose of providing an "interlock" in order to positively prevent shifting away from one gear position and then back into the same gear position instead of completing the shifting operation into another selected gear position. In actual practice, however, the operation of the mechanism has been found to be so perfect as not to need the "interlocking" feature.

The perspective showing in Figure 1 is taken looking toward the forward end of the vehicle, and since the selector handle 67 is adapted to move exactly in accordance with a conventional gear shift lever, the selector handle is moved toward the left and rearwardly for low gear position. Assuming that the operation has been started with the gears in neutral position, the movement of the selector handle to low gear position opens the pipe 48 to the atmosphere, whereupon the crossover motor 55 will be energized to slide the link 33 toward the right as viewed in Figures 1 and 2. This movement is transmitted to the lever 24, thus moving the lever 21 toward the right to engage the finger 22 in the notch 19 of the shift bar 14.

The movement of the selector handle rearwardly into the low gear position opens the pipe 62 to the atmosphere and maintains the pipe 63 closed to the atmosphere. Under such conditions the valve mechanism 42 will function to connect the pipe 44 to the intake manifold or other source of vacuum. At the same time the pipe 45 will communicate with the atmosphere, and accordingly differential pressure will act on the piston 38 to move it upwardly.

This action obviously swings the bell crank 75 lever 32 in a counter-clockwise direction as viewed in Figure 1, and thus the yoke 31 will swing the outer end of the lever 21 rearwardly and the inner end of this lever forwardly. Thus, with the finger 22 arranged in the notch 19, the action referred to moves the shift bar 14 forwardly to place the gear set in low gear.

The clutch is then engaged and the throttle opened to accelerate the vehicle speed in the usual manner, whereupon the clutch may be disengaged and the gears shifted to second gear position. As previously stated, the valve mechanism 54 permits preselection to take place, and if desired, the selector handle 67 may be moved prior to clutch disengagement. Under such conditions, as will be apparent, the shift into second gear will not occur until after the clutch has been disengaged. Assuming that the selector handle 67 has been moved forwardly from the low gear position, and then transversely in neutral position, and then again forwardly into second gear position, the shift into second gear will occur upon clutch disengagement. The movement of the selector handle transversely in neutral position closes communication between the pipe 48 and the atmosphere. The movement of the selector handle forwardly into second gear position opens the pipe 63 and closes the pipe 62 to the atmosphere, thus causing the valve mechanism 42 to reverse the previously described operation of the motor 36.

Air will be admitted into the upper end of the cylinder 37 and will be exhausted from the lower end thereof, thus rotating the arm 32 in a clockwise direction as viewed in Figure 1. It will be recalled that in the low gear position the finger 22 will have been arranged in the notch 19 with the shift bar 14 moved forwardly. The reversal of the action of the motor 36 obviously moves the shift bar 14 rearwardly until the notches 18 and 19 coincide, whereupon the biasing means of the motor 55 will cause movement of the link 33 to the left, thus swinging the lever 24 and shifting the lever 21 to bring the finger 22 into engagement with the notch 18. The piston 38 then continues its downward movement, whereupon the shift bar 13 will be shifted rearwardly into the second gear position.

After proper acceleration has been accomplished in second gear, the selector lever 67 may be moved rearwardly into the high gear position, and since such position is on the same side of the H-slot 68 as the second gear position, the pipe 48 will remain closed to the atmosphere and the motor 55 will remain inoperative. Thus the finger 22 will remain in engagement with the notch 18 of the shift bar 13 and the rearward movement of the selector handle 67 will again reverse the operation of the motor 36. The piston 38 will move from the lower end of the cylinder 37 to the upper end thereof, thus rocking the bell crank lever 32 in a counter-clockwise direction through its entire range of movement. The movement thus transmitted to the lever 21 will effect movement of the shift bar 13 forwardly from the second gear position to the high gear position, whereupon the clutch may be engaged and the throttle operated in the usual manner to accelerate the vehicle speed.

From the foregoing it will be apparent that the present construction provides simple and novel means for effecting the gear shifting movement of the gear set. The over-all height of the levers 21 and 24 and link 33 is kept within extremely small limits, and all shifting motions take place horizontally. Accordingly the entire mechanism is adapted to be associated with the casing 11, thus permitting the cover plate 12 to be freely removed whenever desired. This is particularly practicable in view of the fact that the apparatus as a whole is so accurate and positive in operation as to eliminate the necessity for the provision of the usual tower together with means for permitting the manual operation of the gear set.

It will be apparent that the link and lever means employed for effecting the shifting operations are extremely simple in construction, thus permitting economical manufacture and installation of the apparatus. As previously stated, the component of movement of the link 33 longitudinally of the vehicle is so slight as to permit a sliding fit of the opening 34 with the link 33. In this connection, it will be noted that the pivotal connection 35 is located intermediate the length of the lever 24, thus making the length of the sliding movement of the link 33 approximately half the movement of the finger 22 between the slots 18 and 19. This construction not only reduces to a negligible quantity the horizontal component of movement of the link 33 longitudinally of the vehicle, but also effects an extremely rapid transfer of the shifting operation between the shift bars 13 and 14. The construction also permits any desired relation between the lever lengths on opposite sides of the pivot of the lever 21, thus permitting the provision of an extremely rapid longitudinal shifting operation.

The functioning of the valve 49 is clearly disclosed in Patent No. 2,030,838, previously referred to, although in such patent the slide valve 50 is actuated by the lower end of the lever through which the shifting action is completed in such patent. This is of no importance, however, since it merely is necessary that the valve 50 function in accordance with the longitudinal shifting action, and the connection of the valve 50 to the lever 20 causes the valve mechanism 49 to function exactly in accordance with the operation disclosed in the prior patent referred to, such valve mechanism being provided particularly for the purpose of stopping the operation of the shifting mechanism in neutral position, when desired.

The operation of the form of the invention shown in Figures 4, 5 and 6 is substantially identical with the form previously described and need not be referred to in detail. The longitudinal shifting of one of the rods 73 or 74 is accomplished by energizing the motor 84 by the valve mechanism provided for this purpose. The desired shift rod may be operated by controlling the crossover motor 98, which is accomplished by the proper operation of the selector valve mechanism as will be apparent. When atmospheric pressure is present in the casing section 101, the spring 108 swings the lever 92 to the position shown in Figure 4, whereupon energization of the motor 84 will move the shift rod 73 to effect the shift into first or reverse gears.

When the casing section 101 is connected to the source of vacuum, the diaphragm 103 will be moved toward the right as viewed in Figure 4, against the tension of the spring 108, thus rocking the lever 92 in a clockwise direction to transfer the shift finger 83 to the notch 76. Energization of the motor 84 will then effect movement of the shift rod 74, thus placing the gear set in second or high gear. It will be apparent, of course, that the actual crossover operation can occur only when the shift rods are in the neutral positions shown in Figure 4 with the notches 75 and 76 arranged opposite each other. When a shift is made from one gear position to another, it will be apparent that the shift rods 73 and 74 must be relatively moved to bring them into neutral position, whereupon the crossover operation will take place, followed by the shift into the selected gear position.

The slot 96 permits swinging movement of the lever 77 upon energization of the motor 84 as will be apparent. Sufficient play is provided between the pin 97 and slot 96 to prevent any binding action incident to variations in the radius of the arcuate movement of the pin 97 in the two positions in which swinging movement of the lever 77 takes place.

The form of the apparatus shown in Figures 4, 5 and 6 possesses all of the advantages of the form previously described. In addition, the modified form of the invention has a distinct advantage in that it requires no alteration of the transmission itself. Therefore, the cover plate of a conventional transmission may be removed and the cover plate 71, carrying the mechanical parts of the shift mechanism, may be substituted for the conventional cover plate. This feature of the invention renders possible the economical manufacture and installation of the apparatus and renders it particularly suitable as a replacement unit in conventional transmissions.

It is to be understood that the forms of my invention herewith shown and described are to be taken as preferred examples of the same and that various changes in the shape, size and arrangement of parts may be resorted to without departing from the spirit of the invention or the scope of the subjoined claims.

I claim:

1. A gear shifting mechanism for a motor vehicle having a transmission provided with a pair of selectable shifting elements, comprising a member pivotally supported at one end, a lever pivotally connected intermediate its ends to the other end of said member for swinging movement on an axis parallel to the pivot axis of the first named end of said member whereby said lever is pivotally and bodily movable in a single plane, means for effecting one of said movements of said lever to select one of said elements for actuation, and means for effecting the other movement of said lever to shift the selected element.

2. A gear shifting mechanism for a motor vehicle having a transmission provided with a pair of selectable shifting elements, comprising a member pivotally supported at one end, a lever pivotally connected intermediate its ends to the other end of said member for swinging movement on an axis parallel to the pivot axis of the first named end of said member whereby said lever is pivotally and bodily movable in a single plane, means for shifting said member to bodily move said lever into actuating engagement with one of said elements, and means for swinging said lever on its pivot axis to shift the selected element.

3. A gear shifting mechanism for a motor vehicle having a transmission provided with a pair of selectable shifting elements, comprising a member pivotally supported at one end, a lever pivotally connected intermediate its ends to the other end of said member for swinging movement on an axis parallel to the pivot axis of the first named end of said member whereby said lever is pivotally and bodily movable in a single plane, a control element pivotally connected to said member, means for actuating said control element to transmit bodily movement to said lever to bring it into actuating engagement with one of said shifting elements, and means for swinging said lever about its pivot axis to shift the selected element.

4. A gear shifting mechanism for a motor vehicle having a transmission including a casing provided with a pair of openings therethrough and a pair of parallel shiftable elements lying in a horizontal plane in said casing, comprising a lever having one end projecting through one of said openings, a reach member having one end pivotally supported by said casing to swing on a vertical axis and having its other end pivotally connected to said lever intermediate the ends thereof on a vertical axis, means projecting through the other opening in said casing for shifting said reach member to engage a portion of said lever with one of said shiftable elements, and means engaging the projecting end of said lever to swing the latter about said second pivot axis to shift said last named element.

5. A gear shifting mechanism for a motor vehicle having a transmission including a casing provided with a pair of openings therethrough and a pair of parallel shiftable elements lying in a horizontal plane in said casing, comprising a lever having one end projecting through one of said openings, a reach member having one end pivotally supported by said casing to swing on a vertical axis and having its other end pivotally connected to said lever intermediate the ends thereof on a vertical axis, a link projecting through the other opening in said casing and connected to said reach member, means for actuating said link to transmit movement to said lever to engage a portion thereof with one of said shiftable elements, and means engaging the projecting end of said lever to swing the latter about said second named pivot axis to shift said last named element.

6. A gear shifting mechanism for a motor vehicle having a transmission including a casing provided with a pair of openings therethrough and a pair of parallel shiftable elements lying in a horizontal plane in said casing, comprising a lever having one end projecting through one of said openings, a reach member having one end pivotally supported by said casing to swing on a vertical axis and having its other end pivotally connected to said lever intermediate the ends thereof on a vertical axis, a link projecting through the other opening in said casing and connected to said reach member, means for actuating said link to transmit movement to said lever to engage a portion thereof with one of said shiftable elements, and a bell crank lever having a forked end engaging the projecting end of said lever to swing the latter about its pivot axis to shift said last named element.

7. A gear shifting mechanism for a motor vehicle having a transmission including a casing provided with a pair of openings therethrough and a pair of parallel shiftable elements lying in in a horizontal plane in said casing, comprising a lever having one end projecting through one of said openings, a reach member having one end pivotally supported by said casing to swing on a vertical axis and having its other end pivotally connected to said lever intermediate the ends thereof on a vertical axis, a link slidable in the other opening in said casing and having its inner end pivotally connected to said reach member intermediate the ends thereof, means for effecting movement of said link to effect bodily movement of said lever to bring a portion thereof into engagement with one of said shiftable elements, and means for swinging said lever about its pivotal axis to shift said last named element.

8. A gear shifting mechanism for a motor vehicle having a transmission provided with a selective mechanism for determining the gear ratio, and having a casing and a cover plate therefor, comprising a pair of interengaging horizontal levers supported by said cover plate for horizontal movement, means actuating one of said levers to effect movement of the other lever for selecting the gear ratio, and means for actuating said last named lever for shifting said mechanism into the selected gear ratio.

9. A gear shifting mechanism for a motor vehicle having a transmission provided with a selective mechanism for determining the gear ratio, and having a casing and a cover plate therefor, comprising a pair of interengaging horizontal levers supported by said cover plate for horizontal movement, a motor supported solely by said cover plate and connected to one lever to move the latter in a horizontal plane and effect bodily movement of the other lever to select the gear ratio, and means for moving said last named lever in a horizontal plane to shift said mechanism into the selected gear ratio.

10. A gear shifting mechanism for a motor vehicle having a transmission provided with a casing and a pair of shiftable elements for determining the gear ratio, a lever supported by said casing for swinging movement about a vertical axis, one end of said lever being arranged within said casing and engageable with said shiftable elements and the other end extending wholly externally of said casing, a horizontal pivoted member within said casing and engaging said lever, means for swinging said pivoted member to establish mechanical connection between the inner end of said lever and either of said shiftable elements whereby the latter will be shifted upon swinging movement of said lever, and means connected to the outer end of said lever for swinging it about its axis.

11. A gear shifting mechanism for a motor vehicle having a transmission provided with a casing having a cover plate, and a pair of elements shiftable for determining the gear ratio, comprising a horizontal lever arranged transversely of and extending through the cover plate and pivotally supported thereby for swinging movement on a vertical axis, one end of said lever being arranged within said cover plate and engageable with said shiftable elements and the other end extending wholly externally of said cover plate, a horizontal pivoted member within said cover plate and engaging said lever, means for effecting movement of said pivoted member to establish mechanical connection between the inner end of said lever and either of said shiftable elements for shifting the latter upon swinging movement of said lever, and means connected to the outer end of said lever for swinging it about its axis.

12. A gear shifting mechanism for a motor vehicle having a transmission provided with a casing having a cover plate including side walls, one of which is provided with an opening, and a pair of shiftable elements for determining the gear ratio, comprising a rocking member arranged in said opening to rock on a vertical axis, a horizontal lever arranged transversely of the cover plate and extending through said rocking member to be pivotally supported intermediate its ends thereby, one end of said lever being arranged within said cover plate and the other end extending wholly externally thereof, a horizontal pivoted member within said cover plate, means for effecting movement of said pivoted member to establish mechanical connection between the inner end of said lever and either of said shiftable elements for shifting the latter upon swinging movement of said lever, and means connected to the outer end of said lever for swinging it about the axis of said rocking member.

13. A gear shifting mechanism for a motor vehicle having a transmission provided with a casing having an opening in one wall thereof, and a plurality of shiftable elements for determining the gear ratio, comprising a rocking member arranged in said opening to rock on a fixed axis, a selecting and actuating mechanism for said shiftable elements comprising a pair of members one of which is a lever extending through said rocking member to swing about the pivot axis thereof and mounted to slide longitudinally through said rocking member, the other member of said pair being pivotally connected to said first named member, one of said members having means selectively engageable with said shiftable members, means for effecting movement of said other member to move said lever through said rocking member and bring said engageable means into engagement with one of said shiftable members, and means for swinging said lever on the pivot axis of said rocking member to shift the selected shiftable element.

EDWARD D. LASLEY.